United States Patent [19]

Parent

[11] 4,225,647

[45] Sep. 30, 1980

[54] ARTICLES HAVING THIN, CONTINUOUS, IMPERVIOUS COATINGS

[76] Inventor: Richard A. Parent, 69 Waterford Way, Fairport, N.Y.

[21] Appl. No.: 857,028

[22] Filed: Dec. 2, 1977

[51] Int. Cl.[3] ........................ B32B 15/08; B32B 27/28; B32B 27/12

[52] U.S. Cl. ........................................ 428/336; 427/226; 427/295; 428/24; 428/35; 428/411; 428/426; 428/429; 428/447; 428/457; 428/500; 428/907; 428/921; 528/396; 430/26; 427/388.1

[58] Field of Search ............... 428/409, 411, 447, 457, 428/461–463, 519–522, 500, 336, 907, 921, 537; 427/388 R, 295, 226, 248 R, 255

[56] References Cited

U.S. PATENT DOCUMENTS

| | | | |
|---|---|---|---|
| T954,010 | 1/1977 | Brunner et al. | 428/447 X |
| 2,368,606 | 1/1945 | White | 428/457 |
| 2,455,114 | 11/1948 | Cobb | 428/457 X |
| 3,429,739 | 2/1969 | Tittmann et al. | 428/264 |
| 3,922,467 | 11/1975 | Pinchon | 428/411 |
| 3,974,323 | 8/1976 | Brouillette | 428/457 |
| 4,056,208 | 11/1977 | Prejean | 428/522 X |
| 4,062,997 | 12/1977 | Hotta et al. | 428/520 X |

FOREIGN PATENT DOCUMENTS 1570137 6/1969 France .

OTHER PUBLICATIONS

Chemical Abstracts, vol. 83, entry 13322v, 1975, citing I to Japanese Patent 74,109,841, Oct. 18, 1974.

Magee et al., IEEE Transaction on Magnetics, vol. Mag. 6, No. 1, Mar. 1970, pp. 34–37.

*Primary Examiner*—Harold Ansher

[57] ABSTRACT

Various objects may be maintained in their original condition or protected from further damage by physical, chemical, and biological forces by applying thereto thin, continuous, impervious coatings of vapor-deposited poly(p-xylylene) polymer or derivatives thereof. By the invention, it is possible to protect paintings, photographs, documents, articles of sculpture, silver objects, coins, fishing hooks and lures, marine fittings and hardware, batteries, fuel cells, automotive parts, water pollution control devices, logic circuits, electrical components, electric motors and parts, light bulbs, ammunitions, fireworks, glass items, decorative items, timepieces, and decorative wrought iron grillwork.

6 Claims, No Drawings

ARTICLES HAVING THIN, CONTINUOUS, IMPERVIOUS COATINGS

BACKGROUND OF THE INVENTION

The present invention relates generally to the coating of various objects. More specifically, this invention relates to the coating of vapor-deposited poly(p-xylylene) and derivatives thereof onto substrate surfaces and the articles so produced.

High quality uniform coatings on substrates have not been readily achieved with the coating processes known in the prior art. For example, production batches of coated substrates formed by dipping or spraying with a solution or hot melt contain an undesirably high quantity of agglomerates, particularly when thick coatings are applied, and individual articles which are not uniformly or completely coated. Further, it is difficult, if not impossible, to remove from a batch any articles having non-uniform or incomplete coatings. Articles may also be coated by tumbling them with coating materials in rotating barrels. The articles to be coated and the results obtained with this technique are limited. Control of the coating thickness is extremely difficult, especially when the article to be coated has an irregular shape. In addition, excessive agglomeration, considerable stocking of the wetted articles to the barrel walls and substantial barrel wall cleaning difficulties occur.

While ordinarily capable of producing good quality coatings, conventional coating materials and processes suffer serious deficiences in certain areas. The coatings of most coated objects deteriorates rapidly when exposed to atmospheric conditions, abrasion, chemicals, solvents, and the like. Deterioration occurs when portions of or the entire coating separates from the coated object. The separation may be in the form of chips, flakes or entire layers and is primarily caused by fragile, poorly adhering coating material which fails upon atmospheric exposure, impact, and abrasive contact with other particles. Objects having coatings which tend to chip and otherwise separate from the substrate must be frequently replaced thereby increasing expense and loss of durable life. Thus, generally, coated articles having coatings which tend to chip or separate from the substrate cannot be reused or have poor life qualities. Poor life quality occurs when substrates having damaged coatings are not replaced. Many coating materials having long durability either do not adhere well to the substrate or do not possess the desired viewing characteristics. In addition, articles having discontinuous coatings generally promote adhesion failure between the substrate and the coating materials giving rise to the aforementioned problems and result in variations in lifetime characteristics, premature aging of the coated surface causing degradation of the article, scratching of the surface, not to mention difficulties in repairing articles having discontinuous coatings.

Thus, one of the most severe problems encountered in the commercial application of coatings to substrates has been the difficulty of acquiring strong adhesion of the coating material to the surface of the object to be coated. Most coating materials do not exhibit satisfactory adhesion, especially to a wide variety of substrate surfaces such as metals, plastics, and glass. In the past, specific treatments such as physical or chemical etching of the surface have promoted improved adhesion of the coating material. However, such treatments have been laborious, time-consuming, expensive and of limited benefit.

As alluded to above, the provision of thin, uniform films on various objects has not been met with satisfactorily by prior art materials and processes. The production of thin, uniform coatings from polymers has been attempted by a number of techniques such as; deposition and polymerization of a monomer by means of a glow discharge, deposition from solution, deposition from bulk polymerization by thermal evaporation, and deposition from bulk polymerization by radio frequency sputtering. Films of polymers have been prepared by a number of other methods and are generally suitable for a limited number or range of polymeric materials. However, the formation of polymer films which are transparent, colorless, and tough would be extremely desirable. Among the many polymeric coating materials available, the epoxies, urethanes, and silicones have achieved wide acceptance. These coatings are used extensively for protection of substrates from adverse environmental conditions during storage and operating life. Their most important function is to provide the substrate with a moisture and gas barrier as to prevent degradation of the substrate such as due to corrosion.

However, most such organic polymers are permeable to moisture to some extent and cannot be considered true hermetic seals. It is sometimes the case that leakage of water vapor occurs predominantly through pinholes and other imperfections in the barrier film. These may arise during the drying or curing cycle as a direct result of the tendency of evaporating solvents to leave voids or of solidifying fluid systems to draw away from sharp projections of the coated object. To avoid these problems, multiple coatings are often required which add to processing time and labor costs, or thick layers are applied which add weight.

Therefore, a coating process and material that would be highly controllable as to deposition thickness and uniformity is highly desirable. Further, such coating process and material should eliminate pin holes in the coating, and the coating should also conform to the substrate to provide a continuous, uniform barrier. In addition, the coating should possess superior thermal properties allowing exposure to elevated temperatures for extended periods of time. Further, the coating should be highly resistant to chemical and solvent attack. Finally, such coating should have excellent adhesion and have the ability to be deposited as continuous coatings at thicknesses of from less than about 500 Angstrom units to about 5 mils. Thus, the types of coating materials and methods employed for making coated articles having the aforementioned properties and characteristics are limited.

Thus, it will be appreciated that there is a continuing need for improved coatings for numerous articles.

SUMMARY OF THE INVENTION

It is, therefore, an object of this invention to provide coated articles wherein the above-noted deficiencies are overcome and the above-noted desirable characteristics are obtained.

It is another object of this invention to provide coating materials which tenaciously adhere to substrates.

It is a still further object of this invention to provide coated articles which are more resistant to cracking, pitting, rusting, chipping, flaking and the like.

It is yet another object of this invention to provide coated articles having more stable lifetime characteristics.

It is a further object of this invention to provide coated articles having very thin, uniform coatings.

It is yet another object of this invention to provide coated articles having transparent, colorless, and tough coatings.

It is still another object of this invention to provide improved coated articles which possess a gas and moisture barrier.

It is still another object of this invention to provide more uniformly coated articles which are free of pinholes in the coating.

It is still another object of this invention to provide coated articles having greatly increased useful life.

A still further object of this invention is to provide improved coated articles having physical and chemical properties superior to those of known coated articles.

The above objects and other are accomplished, generally speaking, by providing coated articles comprising a substrate having an outer coating comprising substituted and/or unsubstituted poly(p-xylylene) polymers.

In general, the coating materials of this invention are the products obtained by cleaving the cyclic dimer, [2.2] paracyclophane, and/or derivatives thereof, to provide the reactive vaporous diradicals, and thereafter condensing these vaporous diradicals on the surface of a substrate. Upon condensation, these diradicals instantaneously polymerize to form a film.

The reactive vaporous diradicals hereinabove mentioned can be produced by the thermal homolytic cleavage of at least one cyclic dimer represented generally by the structure:

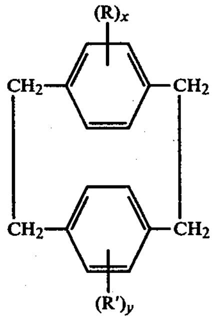

wherein R and R' are nuclear substituents which may be the same or different, x and y are integers from 1 to 4, inclusive, thus forming, upon pyrolysis, two separate reactive vaporous diradicals having the structures:

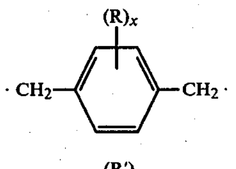

and

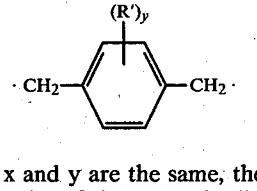

Thus, where x and y are the same, the R and R' are the same, two moles of the same diradical are formed, and when condensed yield a substituted or unsubstituted homopolymer having the structure:

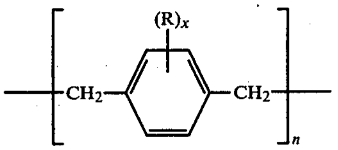

when R and R' and/or x and y are different, condensation of such diradicals will yield copolymers having the general structure:

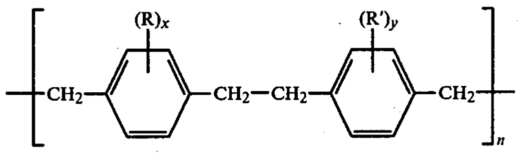

It is also possible to combine several different dimers with various nuclear substituents to form a large number of different and often complicated polymers. This will be obvious to those skilled in the art of polymerization. Furthermore, analogous systems having fused aromatic rings in the dimer structure and polymers resulting therefrom should not be considered beyond the scope of this invention and are obvious to those skilled in the art. Other precursors producing these vaporous diradicals are also considered within the scope of this invention, for example, by pyrolysis of the polymer itself. In addition, chemical modification of the once-formed polymer by chemical after-treatment is also considered within the scope of this invention. Thus, reaction with the aromatic nuclei by methods such as nitration, sulfonation and acylation, and reaction with the ethylene bridges by methods such as free radical halogenation may also be employed and are considered within the scope of this invention.

Inasmuch as the coupling of these reactive diradicals involves the methylene linkages, many unsubstituted or nuclear substituted poly(p-xylylene) polymers can be prepared. Thus, the substituent group can be any organic or inorganic group which can normally be substituted on aromatic nuclei. Illustrations of such substituent groups are alkyl, aryl, acetoxy, alkenyl, aminoalkyl or arylamino, cyano, carboxyl, alkoxy, hydroxy, alkyl, carbonyl, hydroxyl, nitro, halogen, sulfonic acids and esters thereof, phosphorus entities, sulfones, sulfides, alkyl sulfoxy entities, and other groups which may normally be substituted on aromatic nuclei. Otherwise, the position on the aromatic ring is filled by a hydrogen atom.

Particularly preferred of the substituted groups are those simple hydrocarbon groups such as the lower alkyls like methyl, ethyl, propyl, butyl, hexyl; lower aryl hydrocarbons such as phenyl, alkylated phenyl, naphthyl; and the halogen groups, particularly chlorine, bromine, iodine, and fluorine because coating materials having maximum adhesion to substrates and stable lifetime properties are obtained.

The substituted [2.2] paracyclophanes from which these reactive diradicals may be prepared, can be prepared from the cyclic dimer, [2.2] paracylcophane, by appropriate treatment such as halogenation, acetylation, sulfonation, nitration, alkylation, and like methods of introduction of substituent groups onto aromatic nuclei. As indicated above, other precursors may be employed for this purpose. Hereinafter the term a "[2.2] paracyclophane" refers to any substituted or unsubstituted [2.2] paracyclophane as hereinabove discussed.

In the polymerization process to provide the coating materials of this invention, the thermally generated vaporous diradicals condense and polymerize instantaneously on the substrate. Thus, substituted and/or unsubstituted p-xylylene polymer coatings can be made by cooling the vaporous diradicals down to any temperature at or below the condensation temperature of the diradical. It has been observed that for each diradical species, there is an optimum ceiling condensation temperature above which the diradical will not condense and polymerize onto the substrate. Substituted or unsubstituted poly(p-xylylene) coating materials are made by maintaining the substrate surface at a temperature below the ceiling condensation temperature of the particular diradical species involved.

Where different diradicals existing in the pyrolyzed mixture have different ceiling condensation temperatures, as for example, p-xylylene, or cyano-p-xylylene and chloro-p-xylylene or any other mixture with other substituted diradicals, homopolymerization will result when the condensation temperature is selected to be at or below that temperature where only one of the diradicals condense and polymerize. Therefore, it is possible to make homopolymer coating materials from a mixture containing one or more of the substituted diradicals when any other diradicals present have higher condensation temperatures, and wherein only one diradical species is condensed and polymerized on the substrate surface. Of course, other diradical species not condensed on the substrate surface can be drawn through well-known coating apparatus to be condensed and polymerized on a subsequent coating chamber or cold trap. Inasmuch as p-xylylene diradicals, for example, are condensed at temperatures at about 25° to 30° C., which is much lower than cyano-p-xylylene diradicals, i.e., about 120° to 130° C., it is possible to have such diradicals present in the vaporous pyrolyzed mixture. In such a case, homopolymerizing conditions are secured by maintaining the substrate surface at a temperature below the ceiling condensation temperature of the substituted p-xylylene but above that of the p-xylylene, thus permitting the p-xylylene vapors to pass through the apparatus without condensing and polymerizing but collecting the poly-p-xylylene in a subsequent coating chamber or cold trap.

It is also possible to obtain substituted copolymer coating materials through the pyrolysis process hereinabove described. Copolymers of p-xylylene and substituted p-xylylene, as well as copolymers of substituted p-xylylenes can be obtained through said pyrolysis process. Copolymerization occurs simultaneously with condensation upon cooling of the vaporous mixture of reactive diradicals to a temperature below about 200° C. under polymerization conditions. Copolymer coating materials can be made by maintaining the substrate surface at a temperature below the lowest ceiling condensation temperature of the diradical desired in the copolymer, such as at room temperature or below. This is considered "copolymerizing conditions", since at least two of the diradicals will condense and copolymerize in a copolmyer at such temperature.

In the pyrolytic process, the reactive diradicals are prepared by pyrolyzing a substituted and/or unsubstituted [2.2] paracyclophane at a temperature less than about 700° C., and preferably at a temperature between about 550° C. to about 650° C. Pyrolysis of the starting [2.2] paracyclophane begins at about 450° C. regardless of the pressure employed. Operation in the range of 450°–550° C. serves only to increase the time of reaction, lessen the yield of polymer secured, and may result in entraining unpyrolyzed dimer in the polymer film. At temperatures above about 700° C., cleavage of the substituent group may occur, resulting in a tri/or polyfunctional species causing cross-linking or highly branched polymers.

The pyrolysis temperature is essentially independent of the operating pressure. It is, however, preferred that reduced or sub-atmospheric pressures be employed. For most operations, pressures within the range of 0.0001 to 10 mm Hg. absolute are most practical. However, if desired, greater pressures can be employed. Likewise, if desirable, inert vaporous diluents such as nitrogen, argon, carbon dioxide and the like can be employed to vary the optimum temperature of operation or to change the total effective pressure in the system.

Where greater adhesion of poly(p-xylylene) polymers to substrate surface is desired, improved adhesion may be obtained by the use of a substituted silicon compound. That is, poly(p-xylylene) polymers can be adhered to substrate surfaces by providing on the surface of the substrate a silane compound containing, but not limited to, an ethylenically unsaturated group bonded to the silicon of the silane by a carbon-to-silicon bond, and contacting the substrate with a vaporous p-xylylene diradical which upon deposition on the surface of the substrate forms a poly(p-xylylene) coating which adheres to the substrate surface.

It is well known that siloxanes can consist of condensed and hydrolyzed products of substituted silanes. Such compounds can be prepared by any convenient method known in the art. Preferably the siloxanes are formed when reacting the silicon compound containing solution with hydroxyl or oxide surface groups of substrate to be coated. Specific illustrations of substituted silanes containing an ethylenically unsaturated group bonded to the silicon of the silane by a carbon-to-silicon bond, and at least one hydrolyzable group attached directly to the silicon of the silane are vinyltrichloro silane, vinylmethyldichloro silane, and gammamethacryloxypropyltrimethoxy silane. Organo silicon compounds useful in the present invention are known in the art and can be prepared by any conventional method known in the art.

The coated articles of this invention may be provided on their surfaces with a siloxane containing an ethylenically unsaturated group bonded to the silicon of the siloxane by a carbon-to-silicon bond by treating the substrates with a solution produced by dissolving in a solvent a substituted silane containing an ethylenically unsaturated group identical to that of the siloxane and at least one hydrolyzable group attached directly to the silicon of the silane. The solvent employed can vary with the particular silane used. The solvent can vary from halocarbons such as trichloroethylene to ethanol-water or methanol-water mixtures and any suitable solvent system. The amount of silane in solution can be from about 0.05 percent to about 20 percent depending upon the solvent employed. It must be understood that the solvent used and the amount of silane in solution can vary widely and such variations should not be construed as being outside the scope of this invention. Furthermore, solvents other than those specifically named as being preferred, can also be effectively employed without detracting from this invention. It must be understood that the solution can also be formed of a siloxane containing an ethylenically unsaturated group bonded to the silicon of the siloxane by a carbon-to-silicon bond and at least one hydrolyzable and/or condensable group attached directly to the silicon of the silane. Specific illustrations of the preferred types of solutions which can be employed are a 10 percent solution of vinyltrichloro silane in trichloroethylene, 0.1 percent gamma-methacryloxypropyl trimethoxy silane in 99.4 percent methanol-0.5 percent water. These solutions have been preferred, and references to such should not be construed to limit the combinations possible in making a solution of the silicon compound. The substrates can be treated with the aforementioned solutions by such techniques as dipping the substrates directly into the solution, or other conventional techniques. It is also preferred that the treated substrates be dried at ambient temperatures to effect evaporation of the carrier solvent. In certain instances such as when treating the substrates with a 1 percent solution of gamma-methacryloxypropyltrimethoxy silane in 95/5 ethanol-water, it is preferable to bake the substrate at temperatures from about 50°-70° C. after air drying in order to remove the residual non-reacted silane and the rest of the carrier solvent. However, such baking is not always necessary but depends upon the silane and solution used. Other methods of applying the silane from solution or otherwise will be obvious to those skilled in the art. In addition, other adhesion promotion techniques are known and may be employed if desired for the purposes of this invention.

Any suitable thickness of coating material may be employed. However, coatings having a thickness at least sufficient to form a thin continuous film on a substrate is preferred because the coatings will then possess sufficient thickness to resist abrasion and prevent pinholes which adversely affect the properties of the coated articles. Generally, for most articles, the poly(p-xylylene) coating may comprise from about 50 Angstroms to about 5 microns in thickness. Preferably, the poly(p-xylylene) coating should comprise from about 500 Angstroms to about 1 micron in thickness because maximum durability and product quality are achieved.

Any suitable coated or uncoated material may be employed as the substrate for the coated articles of this invention. Typical materials include paintings, photographs, articles of sculpture, silver objects, fishing hooks and lures, marine hardware, electric motors, electrical condensor plates, complete logic circuits, various electrical components, light bulbs such as incandescent, fluorescent or flash, new or old documents, ammunitions, fireworks, batteries, fuel cells, coins, glass items, automobile parts such as internal surfaces of radiators, body and frame parts, engine cooling systems and electrical systems, decorative items, timepieces, building construction articles, windows, and decorative wrought iron grillwork. Essentially, any article exposed to the atmosphere which is either susceptible to physical, chemical, or biological damage, or a combination thereof, may be protected from such in accordance with this invention. In addition, this process may be used to deposit transparent films on glass, fabrics or transparent plastic and thereby serve as an absorber of ultraviolet, visible or infrared light depending on the functional groups attached to the polymer. The ability to absorb the wavelengths of light desired may be initially built into the polymer base such as by using naphthalene or anthracene paracyclophanes as precursors so that the polymers will absorb specific ultraviolet radiation or may be added after the polymer has been formed by reaction of the polymer. An example of the latter could involve nitration followed by reduction, diazotization and coupling to produce polymers which are colored. Other structural modifications to achieve absorption of light of various wavelengths will be obvious to those skilled in the art and should be considered within the scope of this invention.

Further, ultra thin films of these polymers can be produced through deposition on "non-stick" surfaces or on fabric supports. These films can be functionalized by proper selection of the starting paracyclophane or they can be functionalized by chemical after-treatment to produce functionalized thin films that can be used as semipermeable and ion exchange membranes. Ketone substituted polymers could be oxidized to carboxylic acids or the films could be sulfonated to produce cation exchange membranes. These membranes could be used in applications which normally employ ion exchange membranes including the de-salinization of water, specific ion electrodes, and fuel cells among others.

These films, both functionalized or nonfunctionalized, may also be used advantageously to purify various gases since proper control of the film thickness and uniformity could offer selective permeability to some gases.

Thus, in accordance with this invention, poly(p-xylylene) polymer coatings may be formed on substrates to provide them with coatings that adhere well to the substrates, are continuous and pinhole-free, are simple to apply, and have barrier properties which are superior to films of other types applied by other methods. Of particular note, the vapor deposition process provides uniform coatings on irregularly shaped objects producing totally sealed articles. Consequently, this invention enables the sealing of art treasures and commonly used articles that degrade, discolor, or are otherwise adversely affected by contact with air, trace amounts of noxious gases present in the environment, moisture, or corrosive salts. For example, both new and very old paintings are subject to gas fading and degradation as a result of exposure to moisture, oxygen, and noxious gases present in the environment. By this invention, paintings may be provided with a protective barrier to significantly retard or eliminate their degradation from such exposure, and provide further protection against light fading of the pigments and oils. This process will thereby increase the life of the painting, retain its original or present beauty for longer periods of time, and protect or increase its value. Further, the thickness of the applied coating may be regulated so that its appearance will not appear glossy. Other methods of applying such a protective coating are not totally effective because of the irregularity of the surface of most paintings. By the vapor deposition process of this invention, the formed coating will seal the surface permanently and completely. Likewise, other types of painted surfaces may be similarly treated and sealed. In addition, photographs, like paintings, are subject to quality degradation and deterioration as a result of the aforementioned factors. These may be sealed in the same manner as paintings resulting in prolonged life of image quality and color. Since the sealant coating is flexible, cracking of the sealant is not a factor. Further, articles of sculpture are subject to same forces of degradation as mentioned above. There are many examples of art treasures that are continuously being eroded by the forces of nature. Sealing of such artifacts in accordance with this invention will significantly retard their degradation by atmospheric conditions. Obviously, the process for coating larger structures requires specialized equipment; however, the process of this invention would be applicable. Smaller sculptures and other "objects d'art" such as vases and jewelry items may be sealed in the disclosed manner as a means of preserving these articles for future generations. In addition, silver articles are subject to discoloration as a result of exposure to the atmosphere. Thus, silverware, silverplate, and other silver objects may be sealed pursuant to this invention, thereby preventing their discoloration such as by air oxidation normally observed with these articles. More specifically, silver eating utensils, teapots, coffeepots, trays, and other silver items may be sealed, protected, and used in a normal fashion including their washing and drying without experiencing the aforementioned difficulties. A further embodiment of this invention is the formation of a protective coating on coins, old and new, to preserve their condition from handling such as the lustre of their surface and maintain their "untouched" or "mint" condition desired by numismatists. Being thus sealed, the polishing of silver articles and coins would be unnecessary.

Another application of this invention is the coating and sealing of fishing equipment such as hooks, lures, and poles. One of the major problems with fishing equipment is that it will rust or pit rapidly especially when exposed to salt water. Thus, by vapor deposition of a poly(p-xylylene) coating on this equipment, the rusting or pitting process may be eliminated or extensively retarded thereby prolonging its useful life. The deposited coating will provide a barrier to moisture and corrosive elements and seal in the original color and lustre of the equipment. Likewise, marine fittings and marine hardware may be similarly treated in accordance with this invention. Consequently, where desired, generally expensive metals such as stainless steel and alloys such as brass need not be employed where less expensive metals or alloys are coated with poly(p-xylylene) derivatives. Thus, corrosion resistant marine fittings and marine hardware of a more economical nature may be provided by this invention. In addition, submersible electric motors having a coating of vapor deposited poly(p-xylylene) may offer significant advantages over those currently in use. The nature of the vapor deposition process would insure complete coating of all exposed parts thereby preventing corrosion and electrical short circuits while allowing efficient dissipation of heat from the motor. Heat transfer to the surrounding media may be accomplished by regulating the thickness of the overcoating. In similar fashion, total logic circuits and their individual components may be coated and sealed from the environment in accordance with this invention. These circuits are subject to corrosion and variable response due to changing environment conditions or the effects thereof. Sealing of total logic circuits or parts thereof using the method herein described offers significant advantages over current methods of protecting such circuits. The deposition of very thin coatings of poly(p-xylylene) derivatives onto these circuits would provide protection of the circuits from corrosion and atmospheric variability yet allow efficient dissipation of heat generated from these circuits. Further, the coated circuits may be used without variability even when submersed in water or salt solutions.

In another embodiment of this invention, the process of vapor-depositing poly(p-xylylene) continuous films or coatings of controllable thickness may be applied to water pollution control devices. In this sense, very thin uniform films are becoming increasingly important in de-salinization and reverse osmosis processes. In addition, semi-permeable membranes may be employed in purifying gases as a pollution control measure. That is, thin films of poly(p-xylylene) or its functionalized derivatives may be employed to permit certain gases or ions to pass therethrough while excluding other gases or ions. By combining this property with the capability of producing very thin uniform films of poly(p-xylylene), it may be possible to purify effluent gases in pollution control devices and for the production of purified gases. Thus, the vapor deposition of very thin films of poly(p-xylylene) or its derivatives on a substrate such as fabric or the use of a self-supporting film thereof may find application in the areas of semi-permeable membranes. Further, additional functionality of the fabricated film may be introduced chemically after the film has been deposited. For example, sulfonation of the existing membrane may provide a sulfonated film to serve as a cationic exchange membrane allowing cations to pass through while excluding anions. In practice, the film thickness may be regulated as to allow only cations of a particular size to pass through while excluding cations of other sizes. In addition, nitration of the existing membrane followed by reduction and quaternization, may provide anion exchange membrane in similar fashion. Further, by virtue of the semipermeable nature of the aforementioned membranes, a potential may be realized across the membranes resulting in the production of electricity. Likewise, a fuel cell may advantageously apply the principles set forth herein.

In a further embodiment of this invention, the process of vapor-depositing poly(p-xylylene) continuous films or coatings of controllable thickness may be applied to various types of ammunitions in order to waterproof them with moisture-impermeable coatings. For example, shotgun shells, standard cartridges such as 22, 32, 38, and 45 caliber, rockets, and large caliber shells such as howitzers may be waterproofed employing the aforementioned process. Such waterproofed articles could then be stored under very moist or humid conditions, or even under water intentionally or otherwise, without adverse effects on the activity of the explosive charge. The polymeric protective coatings may be sufficiently thin so that the ammunitions could be handled within the tolerances of the firing device without any need for its modification. In a similar fashion, fireworks are generally susceptible to deactivation through the effects of moisture, such as by their storage in moist places. Thus, the coating of fireworks with a thin moisture-impervious film will prevent their deactivation by moisture and permit them to be stored under less rigid conditions and remain usable. Further, in all types of batteries, leakage of moisture both in and out of the batteries usually affects their performance and may destroy them thereby precluding the partial or complete function of the device in which they are used. Thus, the coating of batteries, both organic and inorganic, dry cells, mercury cells, nickel-cadmium cells, fuel cells, solar cells, and the like with moisture-impervious poly(p-xylylene) polymers may prevent or significantly minimize moisture leakage and offer advantages over existing systems.

Particular advantage would, obviously, be gained in or near salt water environments.

In another embodiment of this invention, vapor-deposited films and coatings of poly(p-xylylene) would find application on automobile parts. For example, automotive electrical systems are very susceptible to moisture. That is, some automobiles, trucks, motorcycles and the like will not start after a rain or even after setting out in the air on a humid night. This invention can be advantageously applied to alleviating this problem by coating of the various electrical parts in an automotive ignition system such as the distributor, voltage regulator, and connections to and from these parts thereby preventing moisture from penetrating into these parts and avoid the aforementioned problem. Another automotive part that may be advantageously coated with an impervious poly(p-xylylene) film is the interior of the radiator and motor of a water-cooled engine. In common radiators, electrolysis results from contact of water with the internal metal parts, and as a result, rust forms causing degradation of the radiator and eventual leakage. Coating of the entire internal radiator surface and internal engine cooling system with a thin film of poly(p-xylylene) would prevent such degradation without significantly affecting the efficiency of heat exchange between the water and the radiator. Use of this process for rustproofing of automobile bodies and frames are also considered within the scope of this invention.

In a further embodiment of this invention, vapor-deposited films of poly(p-xylylene) would find application on decorative items. For example, various drying processes including freeze drying, are employed as a means of preserving the natural beauty of numerous objects such as living flowers and freshly slaughtered animals for their use as "objects d'art". The dried object may be subjected to the coating process described in this invention to preserve its natural color and its tissues thereby rendering the object less susceptible to atmospheric degradation and also provide it with increased strength as a result of the deposited coating.

In a further embodiment of this invention, vapor-deposited films of poly(p-xylylene) would find application on various timepieces. For example, some watches claim water repellancy or water resistance, but for the most part, these claims fall short of their goal. However, application of a poly(p-xylylene) coating to such timepieces would result in waterproof watches. In addition, such a coating would prevent atmospheric gases from penetrating to the interior mechanism thereby avoiding degradation of critical mechanical parts. Since the coating process may be carried out under vacuum, the timepieces could be sealed under vacuum allowing more accurate functioning of the timepieces in addition to both moisture and atmospheric insensitivity.

In a further embodiment of this invention, vapor-deposited films of poly(p-xylylene) would find application in numerous miscellaneous areas. For example, light bulbs, both incandescent and fluorescent, may be coated internally or externally to provide them with shatterproof properties. Miscellaneous other glass objects may be similarly treated to provide them with increased strength and protection against shatter. In addition, added strength and protection may be provided to old documents, books, and the like to prevent their further degradation. Further still, chlorinated analogs and other halogenated analogs, as well as other functionalized analogs, of poly(p-xylylene) and substituted poly(p-xylylene) or derivatives of poly(p-xylylene) may be employed to produce fire retardant films for use on various articles including fabrics.

The coatings employed in the present invention are nontacky and have sufficient hardness at normal temperatures to minimize damage due to impaction; form strong adhesive coatings which resist flaking under normal conditions; and have protective properties such that they can be used on a wide variety of articles, so that the articles retain their original characteristics. Thus, due to the excellent physical characteristics and favorable chemical properties exhibited by p-xylylene polymers, these materials may be advantageously utilized as coatings for many objects.

When vapor phase polymerization of p-xylylene is employed, according to the present invention, to coating articles, it has been found that the coatings are uniform and that they adhere tenaciously to the substrates.

Finally, articles coated with p-xylylene polymers in accordance with the techniques of the present invention have been found to have a greatly increased service life.

The surprisingly better results obtained with the poly(p-xylylene) coating materials of this invention may be due to many factors. For example, the marked durability of the coating material may be due to the fact that these poly(p-xylylene) polymers adhere extremely well to the substrates tested. Outstanding abrasion resistance is obtained when the poly(p-xylylene) coating materials of this invention are applied to steel or similar metallic particles. Coatings prepared from the polymers of the invention possess smooth outer surfaces which are highly resistant to cracking, chipping and flaking. When these poly(p-xylylene) polymers are employed as coatings for various articles, article life is unexpectedly extended, particularly with respect to atmospheric exposure. Additionally, the hydrophobic properties of the coating materials of this invention appear to contribute to the stability of the properties of the coated articles over a wide relative humidity range.

Any suitable poly(p-xylylene) polymer may be employed as the coating material of this invention. Typical poly(p-xylylene) polymers include poly(chloro-p-xylylene), poly(dichloro-p-xylylene), poly(cyano-p-xylylene), poly(iodo-p-xylylene), poly(fluoro-p-xylylene), poly(hydroxy-methyl-p-xylylene), poly (ethyl-p-xylylene), poly(methyl-p-xylylene), poly(aminomethyl-p-xylylene), poly(carboxy-p-xylylene), poly(carbomethoxy-p-xylylene), and mixtures thereof.

The following examples further define, describe, and compare preferred methods of preparing the poly(p-xylylene) coated articles of the present invention in coating applications. Parts and percentages are by weight unless otherwise indicated.

EXAMPLE I

Poly(p-xylylene) coated articles are prepared by placing a supply of the cyclic dimer, [2.2] paracyclophane, in a sublimer which is heated to a temperature of about 140° C. Sublimation is carried out under a vacuum of about 10 microns of Hg. The sublimed vapors enter a pyrolysis furnace maintained at a temperature of about 680° C. and under a vacuum of about 10 microns of Hg. In this pyrolysis zone, the dimer is converted to reactive diradicals which pass into a deposition zone maintained at a temperature of about 25° C. and containing a "Gold Rebel" sinking lure model #51050-02 (available from Plastics Research and Development Corp., Fort Smith, Arkansas) which was suspended by its nose using monofilament nylon line. Upon contact of the reactive diradicals with the fishing lure, a thin hard, continuous coating of poly(p-xylylene) forms on the surface and hooks. Vapors which do not condense in the deposition zone are removed by a cold trap which protects the vacuum pump from contamination. The coated fishing lure is removed from the deposition chamber. Examination showed the poly(p-xylylene) was adhered to the fishing lure and no further treatment was necessary. This lure and an uncoated, untreated lure were stored for 6 months in a wet container and were occasionally used for fishing. At the end of the six-month period, the treated lure showed no rust or pitting on the metal parts and maintained its original lustre while the untreated lure became dull in color and considerable rust or pitting was present on the metal parts.

EXAMPLE II

Poly(p-xylylene) coated articles are prepared by piecing a supply of the cyclic dimer, [2.2] paracyclophane having a chlorine atom substituted on each aromatic ring, in a sublimer which is heated to a temperature of about 140° C. Sublimation is carried out under vacuum at about 10 microns of Hg. The sublimed vapors enter a pyrolysis furnace maintained at a temperature of about 680° C. and under a vacuum of about 10 microns of Hg. In this pyrolysis zone the dimer is converted to reactive diradicals which pass into a deposition zone maintained at a temperature of about 25° C. and containing about ten 22 cal. "Long Rifle" cartridges (Federal Cartridge Corp., Minn., Mn., Cat. #810 and Remington Arms Co. Inc., Bridgeport, Conn., Cat. #MK22). The deposition chamber is rotated at a speed of between about 10 r.p.m. and about 50 r.p.m. Upon contact of the reactive diradicals with the cartridges, a thin, hard, continuous coating of poly(chloro-p-xylylene) forms on the outer surface of the cartridges. Vapors which do not condense in the deposition zone are removed by a cold trap which protects the vacuum pump from contamination. The coated cartridges are removed from the deposition chamber. Examination showed the poly(chloro-p-xylylene) was adhered to the surface thereof and no further treatment was necessary. Ten treated and ten untreated cartridges were then soaked in water for 2 weeks, dried with a papertowel and fired from a rifle (Springfield Model #87A, J. Stephens Arms Co., Chicopee Falls, Mass.). Only 4 out of the ten untreated cartridges fired properly whereas all of the treated cartridges fired properly.

EXAMPLE III

Poly(dichloro-p-xylylene) coated articles are prepared by placing a supply of the cyclic dimer, [2.2] paracyclophane, having two chlorine atoms substituted on each aromatic ring, in a sublimer which is heated to a temperature of about 140° C. Sublimation is carried out under vacuum at about 10 microns of Hg. The sublimed vapors enter a pyrolysis furnace maintained at a temperature of about 680° C. and under a vacuum of about 10 microns of Hg. In this pyrolysis zone the dimer is converted to reactive diradicals which pass into a deposition zone maintained at a temperature of about 25° C. and containing a used Timex water resistant watch (Timex Corp., Little Rock Ark.) suspended from the band attachment by a wire. Upon contact of the reactive diradicals with the watch, a thin, hard, continuous coating of poly(dichloro-p-xylylene) forms on the surface thereof. Vapors which do not condense in the deposition zone are removed by a cold trap which protects the vacuum pump from contamination. The coated watch was removed from the deposition chamber. Examination showed the poly(dichloro-p-xylylene) was adhered to the surface thereof and no further treatment was necessary. Both the above treated watch and untreated similar used water resistant Timex watch were wound fully but not excessively and were placed under water. Each watch was wound daily, and after three days, the untreated watch stopped and could not be restarted. Extensive moisture was in evidence inside the crystal. The treated watch, however, was maintained for two weeks under water with daily winding. At that time, the watch was still running and no moisture was in evidence inside the watch crystal.

EXAMPLE IV

Poly(p-xylylene) coated articles are prepared by placing a supply of the cyclic dimer, [2.2] paracyclophane, in a sublimer which is heated to a temperature of about 150° C. Sublimation is carried out under vacuum at about 10 microns of Hg. The sublimed vapors enter a pyrolysis furnace maintained at a temperature of about 680° C. and under a vacuum of about 10 microns Hg. In this pyrolysis zone, the dimer is converted to reactive diradicals which pass into a decomposition zone maintained at a temperature of about 25° C. and containing five silver spoons which have been precoated with about 0.7 percent by volume solution of gamma-methacryloxypropyltrimethoxy silane in 99.4 percent methanol-0.5 percent water. The spoons were dipped in the silane solution for 10 minutes, air dried for 30 minutes, and then baked at 70° C. for 30 minutes. The deposition chamber is rotated at a speed of between about 10 r.p.m. and about 50 r.p.m. Upon contact of the reactive diradicals with the precoated silver spoons, a thin, hard, continuous coating of poly(p-xylylene) forms on the surface of the spoons. Vapors which do not condense in the deposition zone are removed by a cold trap which protects the vacuum pump from contamination. The coated spoons are removed from the deposition chamber. Examination showed the poly(p-xylylene) was adhered to the silver spoons and no further treatment was necessary. The five treated spoons together with five untreated silver spoons were left outdoors for three months side by side. At the end of that period, the untreated spoons were dark and splotchy in color even after wiping with a damp cloth. The treated spoons, however, were uniformly shiny in appearance after being wiped with a damp cloth. Similar results were obtained when no silane pretreatment was carried out on silver spoons.

EXAMPLE V

Poly(ethyl-p-xylylene) coated articles are prepared by placing a supply of the cyclic dimer, [2.2] paracyclophane, having an ethyl group substituted on each aromatic ring, in a sublimer which is heated to a temperature of about 140° C. Sublimation is carried out under vacuum at about 10 microns of Hg. The sublimed vapors enter a pyrolysis furnace maintained at a temperature of about 680° C. and under a vacuum of about 10 microns of Hg. In the pyrolysis zone, the dimer is converted to reactive diradicals which pass into a deposition zone maintained at a temperature of about 25° C. and containing two light bulbs which have been precoated with about a 0.7 percent by volume solution of gamma-methacryloxypropyltrimethoxy silane as in Example IV. The light bulbs are held so as to prevent coating of the points of electrical contact and rotated at a speed of between about 1 r.p.m. and about 5 r.p.m. Upon contact of the reactive diradicals with the light bulbs, a thin, hard, continuous coating of poly(ethyl-p-xylylene) forms on the surface thereof. Vapors which do not condense in the deposition zone are removed by a cold trap which protects the vacuum pump from contamination. The coated light bulbs are removed from the deposition chamber. Examination showed the poly(ethyl-p-xylylene) was adhered to the light bulbs and no further treatment was necessary. When untreated light bulbs were dropped to a concrete surface from a height of 4 feet, they imploded spreading glass over a wide area. When the treated light bulbs were subjected to the same test, little or no glass scatter was observed.

EXAMPLE VI

Poly(dichloro-p-xylylene) coated articles are prepared by placing a supply of the cyclic dimer, [2.2] paracyclophane, having two chlorine atoms substituted on each aromatic ring, in a sublimer which is heated to a temperature of about 140° C. Sublimation is carried out under vacuum at about 10 microns of Hg. The sublimed vapors enter a pyrolysis furnace maintained at a temperature of about 680° C. and under a vacuum of about 10 microns of Hg. In this pyrolysis zone, the dimer is converted to reactive diradicals which pass into a deposition zone maintained at a temperature of about 25° C. and containing about 20 new U.S. coins of various denominations which have been precoated with about 0.7 percent by volume solution of gamma-methacryloxypropyltrimethoxy silane as in Example IV. The deposition chamber is rotated at a speed of between about 10 r.p.m. and about 50 r.p.m. Upon contact of the reactive diradicals with the coins, a thin, hard, continuous coating of poly(dichloro-p-xylylene) forms on the surfaces thereof. Vapors which do not condense in the deposition zone are removed by a cold trap which protects the vacuum pump from contamination. The coated coins are removed from the deposition chamber. Examination showed the poly(dichloro-p-xylylene) was adhered to the surfaces thereof and no further treatment was necessary. When these treated coins and a similar set of untreated coins were subjected to daily handling and contact with moist soil and perspiration, the untreated coins became dull and unattractive while the treated coins retained their original lustre.

EXAMPLE VII

Poly(p-xylylene) coated articles are prepared by placing a supply of the cyclic dimer, [2.2] paracyclophane, in a sublimer which is heated to a temperature of about 140° C. Sublimation is carried out under vacuum at about 10 microns of Hg. The sublimed vapors enter a pyrolysis furnace maintained at a temperature of about 680° C. and under a vacuum of about 10 microns Hg. In this pyrolysis zone, the dimer is converted to reactive diradicals which pass into a decomposition zone maintained at a temperature of about 25° C. and containing five MOS semiconductors. The deposition chamber is rotated at a speed of between about 10 r.p.m. and about 50 r.p.m. Upon contact of the reactive diradicals with the semiconductors, a thin, hard, continuous coating of poly(p-xylylene) forms on the surfaces thereof. Vapors which do not condense in the deposition zone are removed by a cold trap which protects the vacuum pump from contamination. The coated semiconductors are removed from the deposition chamber. Examination showed the poly(p-xylylene) was adhered to the semiconductors and no further treatment was necessary. Five untreated control MOS semiconductors and those treated above were subjected to a direct current of 15 volts in the usual manner and the leakage current measured. All MOS semiconductors demonstrated leakage currents close to 10 piccoamps at 70° F. and 35% RH. However, when all of the semiconductors were maintained in operation for 1000 hours at 90° F. and 85% RH and leakage currents measured again, the untreated semiconductors demonstrated leakage currents around one microamp while the treated semiconductors demonstrated leakage currents of about 25 piccoamps.

Although specific materials and conditions were set forth in the above examples for making and using the coated articles of this invention, these are merely intended as illustrations of the present invention. Various other articles, substituents and processes such as those listed above may be substituted for those in the examples with similar results.

Other modifications of the present invention will occur to those skilled in the art upon a reading of the present disclosure. These are intended to be included within the scope of this invention.

What is claimed is:

1. A coated metal article comprising a metal substrate having a first layer of a substituted silicon compound containing an ethylenically unsaturated group bonded to the silicon of the silicon compound by a carbon to silicon bond and at least one hydrolyzable group attached directly to the silicon of the silicon compound, and a second outer layer comprising a substituted and/or unsubstituted poly(p-xylylene) polymer, said coated metal article being characterized as possessing a protective outer coating as to render said article more resistant to attack from physical, chemical, or biological damage and provide said article with increased useful lifetime properties.

2. Coated objects of art articles such as vases, jewelry, glass items, and timepieces having a first layer of a substituted silicon compound containing an ethylenically unsaturated group bonded to the silicon of the silicon compound by a carbon to silicon bond and at least one hydrolyzable group attached directly to the silicon of the silicon compound, and a second outer layer comprising a substituted and/or unsubstituted poly(p-xylylene) polymer, said coated articles being characterized as possessing a protective coating as to render said articles more resistant to attack from physical, chemical, or biological damage and provide said particles with increased useful lifetime properties.

3. A coated metal article such as a logic circuit, electrical component, electric motor, condenser plate, and light bulb metallic part having a first layer of a substituted silicon compound containing an ethylenically unsaturated group bonded to the silicon of the silicon compound by a carbon to silicon bond and at least one hydrolyzable group attached directly to the silicon of the silicon compound and a second outer layer comprising a substituted and/or unsubstituted poly(p-xylylene) polymer, said coated metal article being characterized as possessing a protective outer coating as to render said article more resistant to attack from physical, chemical, or biological damage and provide said article with increased useful lifetime properties.

4. A coated metallic marine article which is subject to exposure to water and corrosive conditions such as a fishing hook, fishing lure, marine fitting, marine hardware, and water pollution control device having a first layer of a substituted silicon compound containing an ethylenically unsaturated group bonded to the silicon of the silicon compound by a carbon to silicon bond and at least one hydrolyzable group attached directly to the silicon of the silicon compound, and a second outer layer comprising a substituted and/or unsubstituted poly(p-xylylene) polymer, said coated marine article being characterized as possessing a protective outer coating as to render said article more resistant to attack from physical, chemical, or biological damage and provide said article with increased useful lifetime properties.

5. A coated metallic marine article in accordance with claim 4 wherein said poly(p-xylylene) contains repeating units of the structures:

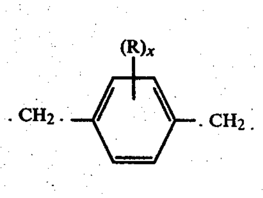

and

-continued

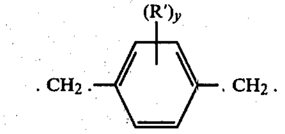

wherein R and R' are nuclear substituents selected from the group consisting of alkyl, aryl, acetoxy, alkenyl, amino-alkyl, arylamino, cyano, carboxyl, alkoxy, hydroxy, carbonyl, hydroxyl, nitro, halogen, sulfonic acids and esters thereof, phosphorus entities, sulfones, sulfides, and alkyl sulfoxy entities which may be the same or different, and x and y are each integers from 1 to 4, inclusive.

6. A coated metallic marine article in accordance with claim 5 wherein R and R' and/or x and y are different and said poly(p-xylylene) is a copolymer having the general structure:

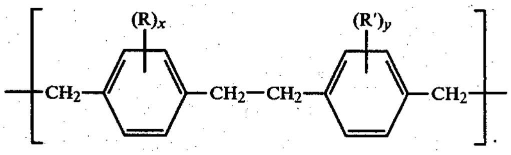

* * * * *

US004225647B1

REEXAMINATION CERTIFICATE (2561st)

United States Patent [19]

Parent

[11] B1 4,225,647

[45] Certificate Issued May 9, 1995

[54] ARTICLES HAVING THIN, CONTINUOUS, IMPERVIOUS COATINGS

[76] Inventor: Richard A. Parent, 69 Waterford Way, Fairport, N.Y. 14450

Reexamination Request:
No. 90/003,300, Jan. 10, 1994

Reexamination Certificate for:

| | |
|---|---|
| Patent No.: | **4,225,647** |
| Issued: | **Sep. 30, 1980** |
| Appl. No.: | **857,028** |
| Filed: | **Dec. 2, 1977** |

[51] Int. Cl.$^{6}$ .......................... B32B 15/08; B32B 27/28; B32B 27/12

[52] U.S. Cl. .................................... 428/336; 427/226; 427/295; 427/388.1; 428/24; 428/35.7; 428/35.9; 428/195; 428/411.1; 428/426; 428/429; 428/447; 428/457; 428/500; 428/542.2; 428/542.4; 428/907; 428/921; 430/126; 528/396

[58] Field of Search ...................... 428/209, 411.1, 447, 428/448, 450, 457, 461, 462, 463, 519, 520, 521, 522, 336, 902, 921, 537; 427/226, 295, 388.1; 114/222, 356; 361/201.5, 323

[56] References Cited

U.S. PATENT DOCUMENTS

| | | | |
|---|---|---|---|
| 3,600,216 | 8/1971 | Stewart | 428/450 |
| 3,947,371 | 3/1976 | Parent et al. | 252/62.1 |

*Primary Examiner*—D. S. Nakarani

[57] ABSTRACT

Various objects may be maintained in their original condition or protected from further damage by physical, chemical, and biological forces by applying thereto thin, continuous, impervious coatings of vapor-deposited poly(p-xylylene) polymer or derivatives thereof. By the invention, it is possible to protect paintings, photographs, documents, articles of sculpture, silver objects, coins, fishing hooks and lures, marine fittings and hardware, batteries, fuel cells, automotive parts, water pollution control devices, logic circuits, electrical components, electric motors and parts, light bulbs, ammunitions, fireworks, glass items, decorative items, timepieces, and decorative wrought iron grillwork.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 5, and 6 is confirmed.

Claims 1–3 are cancelled.

New claim 7 is added and determined to be patentable.

*7. Coated jewelry having a first layer of a substituted silicon compound containing an ethylenically unsaturated group bonded to the silicon of the silicon compound by a carbon to silicon bond and at least one hydrolyzable group attached directly to the silicon of the silicon compound and a second outer layer comprising a substituted and/or unsubstituted poly(p-xylylene) polymer, said coated jewelry being characterized as possessing a protective outer coating as to render said jewelry more resistant to attack from physical, chemical, or biological damage and provide said jewelry with increased useful lifetime properties.*

* * * * *